United States Patent [19]
Sharon

[11] 3,865,114
[45] Feb. 11, 1975

[54] LASER DEVICE PARTICULARLY USEFUL AS A SURGICAL INSTRUMENT

[75] Inventor: Uzi Sharon, Tel-Aviv, Israel

[73] Assignee: Laser Industries, Ltd., Tel-Aviv, Israel

[22] Filed: Oct. 11, 1973

[21] Appl. No.: 405,498

[30] Foreign Application Priority Data
Oct. 11, 1972    Israel..................................... 40544

[52] U.S. Cl. ............................................. 128/303.1
[51] Int. Cl............................................... A61b 17/36
[58] Field of Search............. 128/303 R, 303.1, 395; 331/94.5

[56] References Cited
UNITED STATES PATENTS 3,463,594   8/1969   Myer................................ 256/172
3,481,340   12/1969   McKnight et al................... 128/395
3,659,613   5/1972   Bredemeier......................... 128/395

Primary Examiner—Lawrence W. Trapp
Attorney, Agent, or Firm—Pennie & Edmonds

[57] ABSTRACT

A laser beam manipulator device having apparatus for receiving a laser beam and conducting it to an opening therein in which is located an object to be treated. The manipulator includes a laser beam trap that intercepts the laser beam to prevent it from emerging from the manipulator.

10 Claims, 7 Drawing Figures

LASER DEVICE PARTICULARLY USEFUL AS A SURGICAL INSTRUMENT

BACKGROUND OF THE INVENTION

The present invention relates to laser beam devices, and particularly to laser beam manipulator devices useful as surgical instruments.

As is well known, a laser beam can be focused to a very small spot size such as 100 microns or less in diameter to produce a very hot concentration of light energy. At laser wavelengths such as 10.6 microns that are almost completely absorbed by body tissue, such a focused laser beam may be used to cut through most types of body tissues, for example, to excise a tumor or dead skin. One of the important advantages in using a laser beam for this purpose is that it can make very clean and fine cuts while minimizing damage to tissues outside the cutting lines. Also, the laser beam readily coagulates capillaries and small veins and arteries, thereby minimizing loss of blood and keeping the working area clean.

One problem, however, is using laser beams as surgical devices is the danger of damaging other parts of the body with the laser beam because there is usually no provision for intercepting the laser beam after it has passed through the object being treated. In cases where vital organs may be affected, a protective shield is usually placed between the working area and the organ to be protected to intercept the laser beam and prevent it from reaching the organ. Such a technique, however, is usually not convenient and frequently is not possible, thereby restricting or precluding the use of the laser device for the surgical operation.

SUMMARY OF THE INVENTION

According to a broad aspect of the present invention, there is provided a laser device, particularly useful as a surgical instrument, comprising a manipulator for receiving a laser beam and conducting it to an opening therein in which is located an object to be treated. The manipulator includes a trap that intercepts the laser beam to prevent it from emerging from the manipulator.

The invention may be embodied in a number of forms, some of which are described below.

In one such embodiment, the object-receiving opening is formed at one end of a shaft extending from the manipulator; and the laser beam is directed down this shaft in the general direction of the opening where it may be brought to focus for use in surgery. More specifically, the laser beam is directed at a mirror mounted on one side of the opening that reflects the laser beam across the open end of the shaft. On the opposite side of the shaft, a portion of the shaft intercepts the laser beam after it has been reflected by the reflector and passed through the opening. For use in surgery, the laser beam comes to focus in the opening reflection from the mirror and before interception by a portion of the shaft.

In another embodiment, the object-receiving opening again is formed at one end of a shaft extending from the manipulator; and the laser beam again propagates down this shaft and comes to focus in the opening. The laser beam trap comprises an apertured reflecting means around the object-receiving opening in the shaft. The laser beam is directed at the apertured reflecting means rather than the opening around which said means is located; and the reflecting means is positioned to reflect incident radiation in a direction other than through the opening. Again, the laser beam comes to focus in the opening after reflection from the reflecting means.

In a specific embodiment, the reflecting means is two mirrors disposed on opposite sides of the opening; and the laser beam is formed into two spaced-apart sections by reflecting an incident beam from a pair of spaced-apart mirrors that are oriented to reflect each section of the laser beam toward one of the mirrors disposed around the object-receiving opening. In another embodiment, the reflecting means is an annular-shaped mirror; and the laser beam has an annular cross section conforming, at the opening, to the shape of this mirror. In both embodiments, the reflecting means preferably is oriented to direct the incident beam across the opening so that the point of focus of the beam is as close as possible to the object-receiving open end of the shaft. If desired, focusing of the laser beam may be accomplished, in whole or in part, by using a concave reflecting means.

In still another embodiment, the manipulator again includes a shaft along which the laser beam is conducted and an object-receiving opening near which the laser beam comes to focus. However, the opening is formed in a sidewall of the shaft while an end wall extending across the shaft intercepts the laser beam after it has passed through the working area defined by said opening.

BRIEF DESCRIPTION OF THE DRAWING

These and other objects, features, and elements of the invention will be more readily apparent from the following detailed description of the drawing in which.

DETAILED DESCRIPTION OF THE DRAWING

Figure 1:
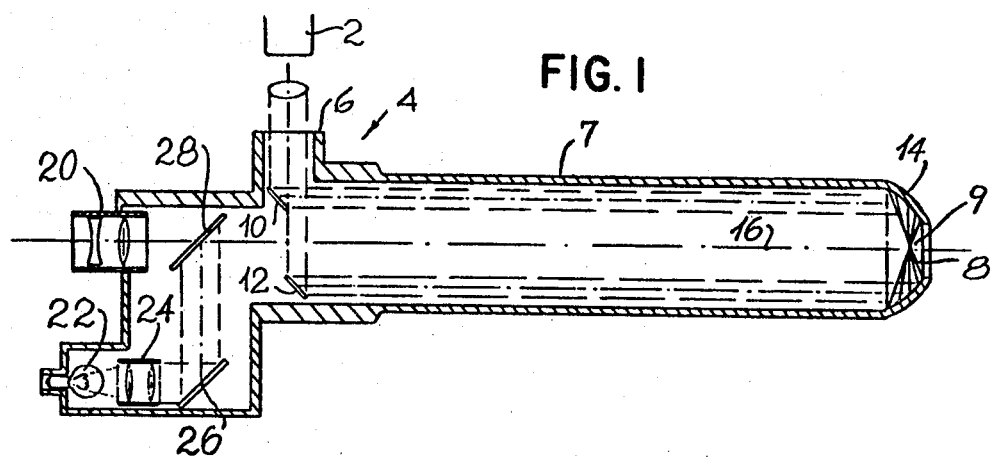
FIG. 1 is a side elevational view illustrating one form of laser device constructed in accordance with the invention.

The laser beam manipulator devices illustrated in the drawing are particularly useful in surgery. Some of these devices, however, may find application in other areas such as precision welding. For convenience, however, since the invention is particularly, although not exclusively, useful in surgical instruments, the description below will henceforth refer only to this application.

Figure 2:
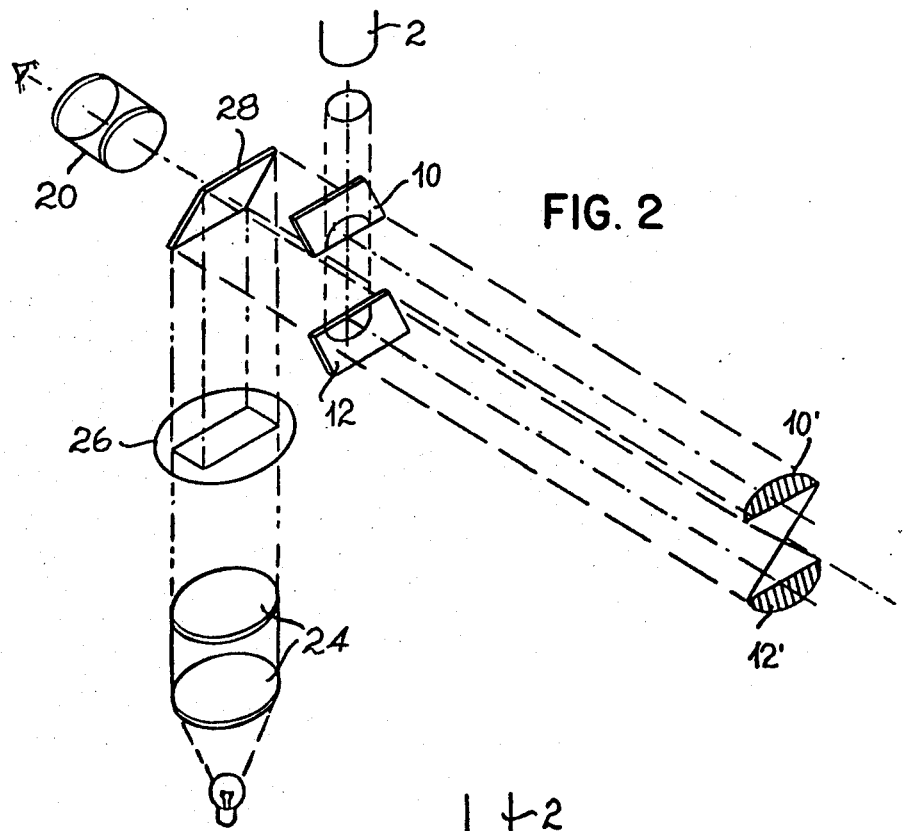
FIG. 2 is a perspective view of the essential elements of the device of FIG. 1.

The apparatus illustrated in FIGS. 1 and 2 of the drawing comprises a laser, generally designated 2, and an enclosed manipulator, generally designated 4. Laser 2 preferably is a high power continuously operating (CW) carbon-dioxide laser. Manipulator 4 receives the laser beam at one opening 6 thereof and conducts it to another opening 8 at the end of a hollow shaft 7. In practice, the manipulator is connected to the laser by an articulated conduit (not shown) that permits the manipulator to be maneuvered so that opening 8 of the manipulator may be placed over an object to be treated, such as a tumor that is to be excised. As shown, the laser beam comes to a focus in a working area 9 adjacent opening 8 where the object to be treated is received. According to the present invention, the manipulator 4 includes a laser beam trap which intercepts the laser beam to prevent it from emerging from the manipulator.

In the embodiment of the invention illustrated in FIGS. 1 and 2, the laser beam trap is provided by first forming the laser beam with a void-center and then reflecting the laser beam across the object-receiving opening 8. The center of the laser beam is aligned with the opening and since that center is void, the beam radiations are substantially prevented from emerging from the manipulator through the opening. The void-center laser beam is formed by a pair of spaced inclined (45 degrees) mirrors 10, 12, disposed in the manipulator in alignment with opening 6 thereof, to intercept the laser beam and to reflect same towards the object-receiving opening 8. As will be seen particularly from FIG. 2, the two mirrors 10, 12 form a two-section beam, the two sections being shown as 10', 12' in FIG. 2, which are spaced from each other to define the hollow or void center of the beam which is in alignment with the object-receiving opening 8. Apertured reflecting means 14 are disposed around the object-receiving opening 8 of the manipulator and reflect the two sections 10', 12' of the beam across the object-receiving opening 8 of the manipulator and into the opposing portion of the reflecting means. As a result, the point of focus of the beam is as close as possible to the object-receiving opening at the end of shaft 7. After the two-section beam has passed across the object-receiving opening, it is then reflected by the apertured reflecting means 14 back into the manipulator, thereby preventing it from emerging from the manipulator.

The apertured reflecting means 14 may be in the form of an annular concave mirror surrounding the object-receiving opening 8. The sides of the mirror are shown in FIG. 1 as including curved walls, but they could also include straight walls. The mirror should be designed so that the rays returned by it are not perfectly parallel in order not to reflect the laser beam back into the cavity of the laser 2.

To permit visual observation of the working area in opening 8, the manipulator further includes an eyepiece 20 aligned with the object-receiving opening 8, and also an illuminating device 22 including a collimator 24, an apertured mask 26, and a beam splitter 28 reflecting the light to the object-receiving opening 6.

The manipulator of FIGS. 1 and 2 may be termed an open-ended, head-on manipulator or endoscope since opening 8 is applied head-on to surround the object being treated, such as a tumor or burnt skin, while the user observes the object to be treated and the treatment as it is being performed.

Figure 3:
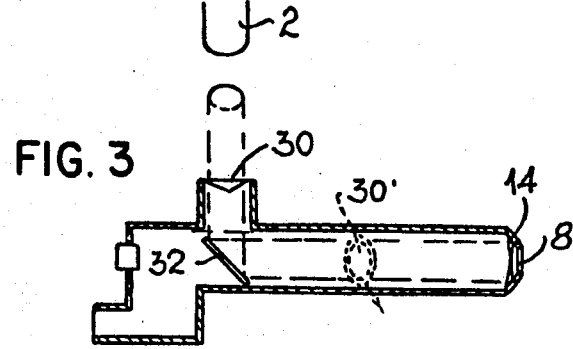
FIGS. 3–7 illustrate modifications of the device of FIGS. 1 and 2.

Instead of using a void-center laser beam having two sections 10', 12', the beam may have an annular cross-section to provide the void or hollow center. This is shown, for example, in FIG. 3 wherein the beam from the laser tube 2 is intercepted by a conventional conical lens 30 to form an annular-shaped beam, shown at 30' in FIG. 3. The annular-shaped beam 30' from the conical lens is reflected by beam-splitter 32 to the annular reflector 14 surrounding the object-receiving opening 8 as in the embodiment shown in FIGS. 1 and 2.

Figure 4:
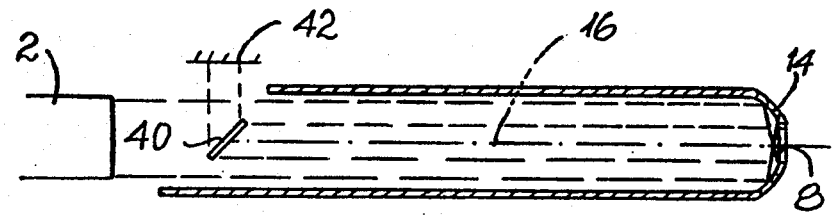

FIG. 4 illustrates a further variation, wherein the annular-shaped laser beam is formed by the use of a circular deflector 40 disposed within the manipulator to intercept the central area of the laser beam before it impinges on the apertured reflector 14 surrounding the object-receiving opening 8. In this case, the laser beam is aligned with the longitudinal axis 16 of the manipulator, rather than being at right angles thereto as in the preceding embodiments. Circular deflector 40, which forms the void or hollow center of the beam, reflects the center of the beam to a heat sink 42 which absorbs this portion of the beam.

Figure 5:
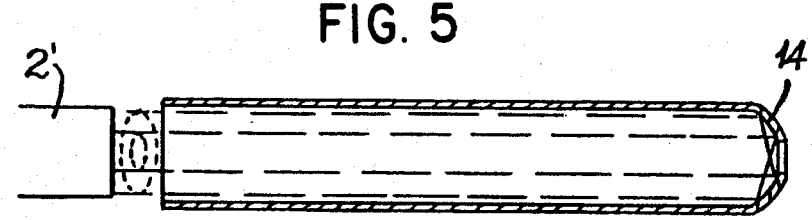

FIG. 5 illustrates a further manner of forming the annular-shaped beam. In this case, the beam is formed directly by the laser 2', for example, by using an annular-shaped window at the end of the laser cavity, or by using coaxial electrodes forming an annular beam, both of which techniques are known.

Figure 6:
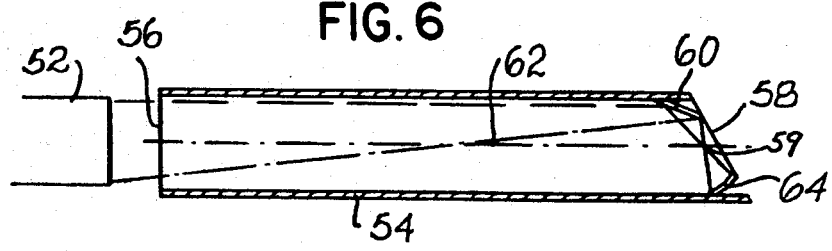
Figure 7:
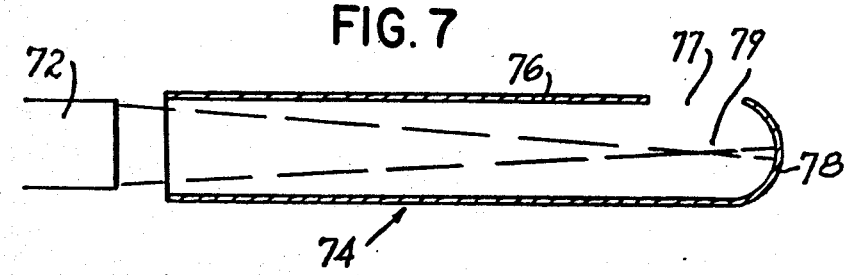

FIGS. 6 and 7 illustrate other arrangements for providing a laser beam trap within the manipulator to prevent the beam from emerging from the manipulator after it has passed through the working area and the object to be treated. In FIG. 6, an enclosed manipulator 54 receives a laser beam from laser 52 at one opening 56 and conducts it along its longitudinal axis to a second opening 58 at its opposite end in which is received an object to be treated. Again, laser beam 52 comes to focus in a working area 59 adjacent opening 58. In this case, manipulator 54 includes a reflector 60 at one lateral side of opening 58. The laser beam is directed at it and is reflected at an angle to the longitudinal axis 62 of the manipulator across opening 58 at the end of the manipulator. The manipulator is formed with a reflector 54 at the opposite lateral side of opening 58 that intercepts the laser beam after it has been reflected by reflector 60 and has passed through the working area. Reflector 64 returns the beam back into the manipulator, thereby preventing it from emerging from the manipulator.

FIG. 7 illustrates still a further variation. Here again, a laser beam from a laser 72 is received at one end of a manipulator 74 and directed along its longitudinal axis. An object-receiving opening 77, however, is formed in a sidewall 76 of the manipulator adjacent to its end wall 78. Thus, the end wall 78 constitutes the laser beam trap which prevents the beam from emerging. Again, as shown, the laser beam is focused at a point in a working area 79 adjacent opening 77.

Many other variations, modifications, and applications of the illustrated embodiments will be apparent to those skilled in the art. For example, there are many other ways to form void-center laser beams and other means may be used to intercept the laser beam so that it cannot leave the manipulator. While the applications presently contemplated for the invention use focused laser beams, the invention may also be practiced without focusing the laser beam.

What is claimed is:

1. A laser beam manipulator device comprising:
   an enclosure;
   an opening in said enclosure defining therein a working area in which may be received an object to be treated;
   means for receiving the laser beam within said enclosure and for conducting it to said opening; and
   means for intercepting the laser beam adjacent the opening, whereby the beam is prevented from emerging through the opening in the enclosure.

2. A device according to claim 1 wherein:
   said object-receiving opening is formed at one end of the manipulator;

said laser beam receiving and conducting means directs the laser beam at a reflecting means at one side of said opening oriented for reflecting the laser beam across said opening; and said means for intercepting the laser beam comprises said reflecting means and means at the opposite side of said opening that intercepts the laser beam after it has been reflected by said reflector and has passed through said working area.

3. A device according to claim 1 wherein:

said object-receiving opening is formed at one end of the manipulator and coaxial with the longitudinal axis thereof;

the means for intercepting the laser beam comprises an apertured reflecting means around the object-receiving opening of the manipulator;

the laser beam receiving and conducting means comprises means for directing the laser beam at the apertured reflecting means and not the opening around which it is located; and said reflecting means is oriented to reflect the incident laser beam in a direction other than through said opening.

4. A device according to claim 3 wherein said receiving and conducting means include means for forming a laser beam into two spaced-apart sections.

5. A device according to claim 4 wherein said means for forming a laser beam into two spaced-apart sections comprises a pair of spaced-apart mirrors disposed in the manipulator to receive the laser beam and to reflect it toward the object-receiving opening.

6. A device according to claim 5 wherein said manipulator further comprises an illuminating device and an eyepiece oriented for illuminating and observing said working area through the spaced-apart region between said pair of mirrors.

7. A device according to claim 3 wherein said laser beam has an annular cross section.

8. A device according to claim 3 wherein said apertured reflecting means comprises an annular concave mirror surrounding the object-receiving opening.

9. A device according to claim 3 wherein:

the reflecting means are oriented to reflect incident radiation across the object-receiving opening; and the laser beam receiving and conducting means further comprises means for bringing said laser beam to focus within said opening after reflection from said reflecting means.

10. A device according to claim 1 wherein said manipulator includes a shaft along which the laser beam is conducted, an object-receiving opening in a sidewall of said shaft, and an end wall extending across said shaft and intercepting the laser beam after it has passed through the working area defined by said opening.

* * * * *